Figure 1:
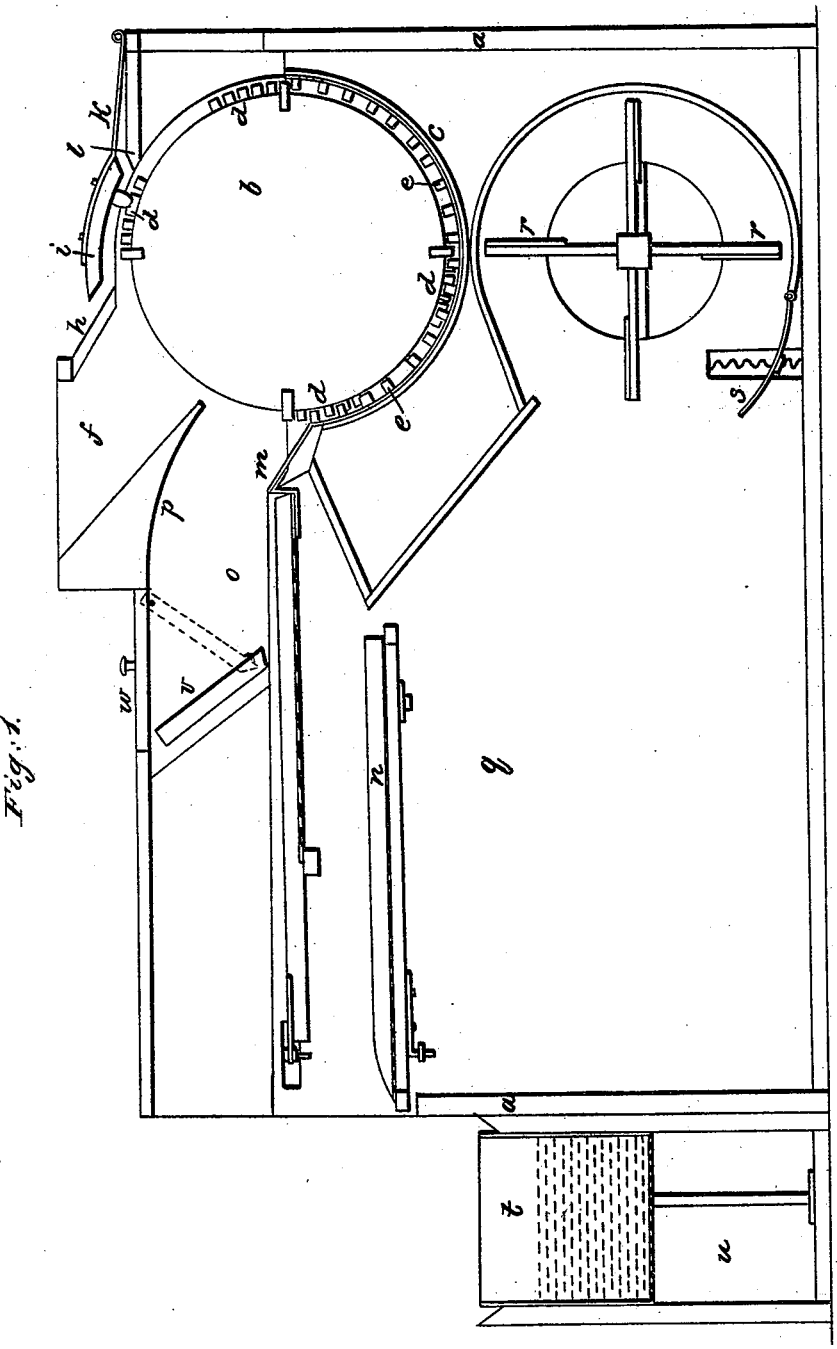

G. GARDNER.
Clover Huller.

No. 5,580.

2 Sheets—Sheet 1.

Patented May 16, 1848.

G. GARDNER.
Clover Huller.
No. 5,580.
2 Sheets—Sheet 2.
Patented May 16, 1848.
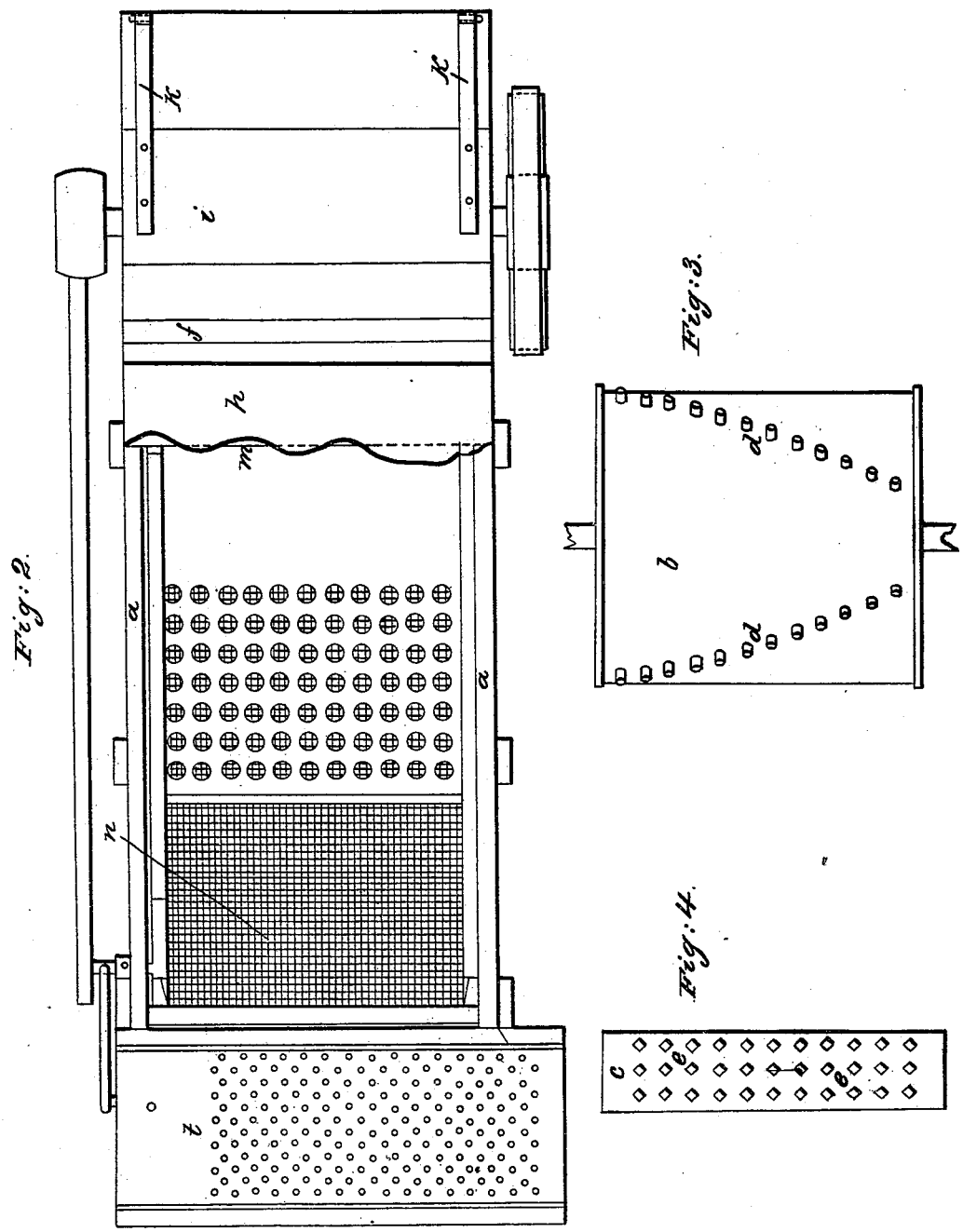

UNITED STATES PATENT OFFICE.

GEO. GARDNER, OF YORK SPRINGS, PENNSYLVANIA.

MACHINE FOR HULLING CLOVER-SEED.

Specification of Letters Patent No. 5,580, dated May 16, 1848.

*To all whom it may concern:*

Be it known that I, GEORGE GARDNER, of York Springs, in the county of Adams and State of Pennsylvania, have invented new and useful Improvements in Machines for Hulling Clover-Seed, and that the following is a full, clear, and exact description of the principle or character which distinguishes them from all other things before known and of the manner of making, constructing, and using the same, reference being had to the accompanying drawings, making part of this specification, in which—

Figure 1 is a vertical section through the machine; Fig. 2, is a plan with a portion of the cap removed; Fig. 3, is the cylinder removed, showing the manner of setting the teeth; and Fig. 4, a section of the concave.

The same letters indicate like parts in all the figures.

The difficulties which my improvements are intended to overcome are the following: first, in machines heretofore used that thresh or hull with rapidity much of the seed is broken or spoiled; this I obviate by the manner of setting the teeth in the cylinder and concave together with their form by which all clogging is prevented and the machine is made to run light which is the second improvement. Another is the contrivance for discharging the stones and other obstructions that would injure the mill were they suffered to pass into the concave before they arrive at that point; and lastly the regulation of the wind from the fan.

The construction is as follows: in a suitable frame (*a, a*) entirely inclosed around there is a cylinder (*b*) placed near the upper part at one end, which constitutes, together with the concave (*c*) by which it is partly surrounded, the threshing apparatus. This cylinder has rows of teeth (*d*) projecting from it which are set obliquely across the cylinder each alternate row being inclined in opposite directions as is clearly shown in Fig. 3; these teeth are made of round pieces of iron their surfaces being carefully smoothed so as not to break the seeds; the concave (*c*) has straight rows of diamond or square shaped teeth (*e*) inserted in it between which the round teeth on the cylinder pass.

The hopper (*f*) is placed above the cylinder, and the top of the side (*h*) under which the feed passes inclines inward as seen in Fig. 1; directly behind this side (*h*) there is a small section (*i*) of the case made so as to raise, it being hinged to the top piece of the frame by long hinges (*k*) and when any stone or other large obstruction is thrown into the mill by accident it is carried up under the piece (*i*) which it raises and the stone is discharged at the point (*l*), (in the drawing Fig. 1 this operation is shown), when the piece (*i*) again falls and the work goes on. The seed is carried down to the concave teeth which commence about on a level with the axis of the cylinder and extend around to a point (*m*) on the opposite side at some distance above it, and directly under the hopper where the seed and chaff are thrown out onto the screen (*n*) which is of common construction and action. The chamber (*o*) where the seed is thrown upon the screen is so constructed that the seed cannot rebound back onto the cylinder, the front partition (*p*) being inclined for that purpose but it is carried forward, screened, and fanned by the apparatus about to be described. Under the screen (*n*) there is an inclosed chamber or box (*q*) to which the screen forms the top, the fan (*r*) is located in the back of this box below the threshing cylinder and is partly surrounded by a concave, to the lower edge of which, a little in front, there is a directing vane or board (*s*) which can be elevated or depressed to give direction to the wind from the fan at pleasure; just in front of the frame there is a screen (*t*) placed inclining to one side under which a box (*u*) is constructed; this is for the purpose of catching the tailings and sifting them before they leave the machine, and also for the further purpose of conducting the tailings to one side out of the way of the chaff and dirt blown from the machine. For the purpose of winnowing by hand the fan can be turned by any convenient fixture and the seed in chaff is fed into a hopper at (*v*) which when the thresher is in operation is laid over against the piece directly before it as shown in Fig. 1, but when a hopper is wanted then the top (*w*) is removed and this piece (*v*) is turned back as shown by the red lines in Fig. 1, and thus forms the hopper for the hand machine.

When my thresher as thus described is in operation the seed &c, is fed into the hopper and is carried over by the cylinder (*b*) being thrown from side to side as it reaches the concave in consequence of the inclination of the rows of teeth in opposite directions, it strikes against the diamond shaped teeth, and is rubbed between them and the round ones on the cylinder without breaking in consequence of the impossibility of their clogging; when the seed is thrown out onto the screen threshed it falls through and soon gets below the upward current of air from the fan the tailings and chaff are managed as in ordinary machines.

What I claim as my invention and desire to secure by Letters Patent is—

1. The combination of the round teeth set in the cylinder, substantially as above described with the diamond shaped teeth of the concave, the whole being constructed in the manner and for the purpose described.

2. I claim the removable piece (*i*) between the hopper and the concave for the purpose of discharging the stones or other obstructions that would be likely to break the machine.

GEORGE GARDNER.

Witnesses:
J. J. GREENOUGH,
A. V. BROWNE.